US008200281B2

United States Patent
Yeh (10) Patent No.: US 8,200,281 B2
(45) Date of Patent: Jun. 12, 2012

(54) SECURE REMOVABLE CARD AND A MOBILE WIRELESS COMMUNICATION DEVICE

(75) Inventor: Bing Yeh, Los Altos Hills, CA (US)

(73) Assignee: Greenliant LLC, Santa Clara, CA (US)

( * ) Notice: Subject to any disclaimer, the term of this patent is extended or adjusted under 35 U.S.C. 154(b) by 442 days.

(21) Appl. No.: 12/502,897

(22) Filed: Jul. 14, 2009

(65) Prior Publication Data

US 2011/0014948 A1    Jan. 20, 2011

(51) Int. Cl.
*H04M 1/00* (2006.01)
*H04B 1/38* (2006.01)
*H04M 9/00* (2006.01)
*H04M 1/66* (2006.01)
*H04M 1/68* (2006.01)
*H04M 3/16* (2006.01)

(52) U.S. Cl. .................. 455/558; 379/433.09; 455/410; 455/411

(58) Field of Classification Search .................. 455/558, 455/410–411; 379/433.09
See application file for complete search history.

(56) References Cited

U.S. PATENT DOCUMENTS

2007/0074273 A1* 3/2007 Linden .............................. 726/3
2008/0288700 A1* 11/2008 Holtzman et al. ............ 710/301

OTHER PUBLICATIONS

PCT Search Report and Written Opinion mailed on Sep. 30, 2010 corresponding to the related PCT Patent Application No. US10/45394.

* cited by examiner

*Primary Examiner* — Vladimir Magloire
*Assistant Examiner* — Munsoon Choo
(74) *Attorney, Agent, or Firm* — DLA Piper LLP (US)

(57) ABSTRACT

A removable card for use with a mobile wireless communication device has a processor and a non-volatile memory, connected to the processor. The removable card has electrical connections for connecting to a mobile wireless communicating device for use by a user to access a common carrier network to access a network of interconnected computer networks ("Internet"). The card comprises a processor and a non-volatile memory connected to the processor. The non-volatile memory has two portions: a first portion and a second portion. The first portion is accessible by the provider of the common carrier network with the processor restricting access thereto by the user. The second portion is accessible by the provider of the common carrier network and with the processor granting access thereto to the user for storing user data therein. Finally, the removable card has logic circuit for encoding the user data to produce encrypted user data, for storing in the second portion.

9 Claims, 5 Drawing Sheets

SECURE REMOVABLE CARD AND A MOBILE WIRELESS COMMUNICATION DEVICE

TECHNICAL FIELD

The present invention relates to a secured removable card having a processor and a non-volatile memory and is suitable for use with a mobile wireless communication device, for connecting to a network of interconnected computer networks ("Internet") in which the non-volatile memory stores program code configured to be executed by the processor and user data. The removable card has a processor and a memory with two portions, with the processor restricting access to the first portion by the user, and granting user access to the second portion to store user data. However, because the network carrier provider has access to both portions and can store the user data in the second portion on the Internet as backup, the user data in the second portion must be rendered secure even from the network carrier.

BACKGROUND OF THE INVENTION

Mobile wireless communication devices, such as cell phones are well known in the art. Typically, a cell phone has a removable card (called "SIM card") which consists of a processor with RAM, ROM or EEPROM or Flash memory, I/O pads, and security monitoring circuit all mounted on a removable card. The non-volatile memory in the SIM card is to store information required to access the mobile operator's network. Thus, the card may store information such as telephone number, access code, number of minutes, calling plan etc.

A network of interconnected computer networks ("Internet") is also well known in the art. The Internet can be accessed by computers having a direct connection (wired or wireless), or through a common carrier wireless network.

With the increase in speed in mobile networks, such as the 3G network, users of mobile wireless devices desire to access the Internet via their mobile wireless communication devices. Even though the speed of the mobile network is increasing, the cost of using that network may also increases with greater use of the common carrier network, especially when accessing the Internet.

Hence, it is desirable to provide a mechanism whereby the user's experience to access the Internet through the mobile network is not diminished, but at the same time, providing means to reduce the cost of accessing the Internet through the mobile network. Further, as the cost of storage capacity continues to decrease, increasingly, the user will store valuable information including person and private information in such portable devices. Because the mobile device can access the Internet, the provider of the common carrier service may offer the service of backing up that data on the Internet. Thus, it is desired to secure the data stored in such portable mobile device. Further, even if the common carrier provider does not offer Internet data back up service, the user may still desire to secure the data, since the portable mobile device can easily be lost or stolen.

Thus, is desired that the data supplied by the user be securely stored in such a mobile device.

SUMMARY OF THE INVENTION

Accordingly, in the present invention, a removable card has electrical connections for connecting to a mobile wireless communicating device for use by a user to access a common carrier network to access a network of interconnected computer networks ("Internet"). The card comprises a processor and a non-volatile memory connected to the processor. The non-volatile memory has two portions: a first portion and a second portion. The first portion is accessible by the provider of the common carrier network with the processor restricting access thereto by the user. The second portion is accessible by the provider of the common carrier network and with the processor granting access thereto to the user for storing user data therein. Finally, the removable card has logic circuit for encoding the user data to produce encrypted user data, for storing in the second portion.

The present invention also relates to a mobile wireless communication device for use by a user to access a common carrier network to access a network of interconnected computer networks ("Internet"). The device comprises a transceiver for communication wirelessly via a wireless common carrier network. The device further has a first processor for controlling communication of the device to connect to the common carrier network. The device further has a second processor and a non-volatile memory connected to the second processor. The non-volatile memory has two portions: a first portion and a second portion. The first portion is accessible by the provider of the common carrier network with the second processor restricting access thereto by the user. The second portion is accessible by the provider of the common carrier network and with the second processor granting access thereto to the user for storing user data therein. Finally the device has a logic circuit for encoding the user data to produce encrypted user data for storing in the second portion.

DETAILED DESCRIPTION OF THE PREFERRED EMBODIMENT

Figure 1:
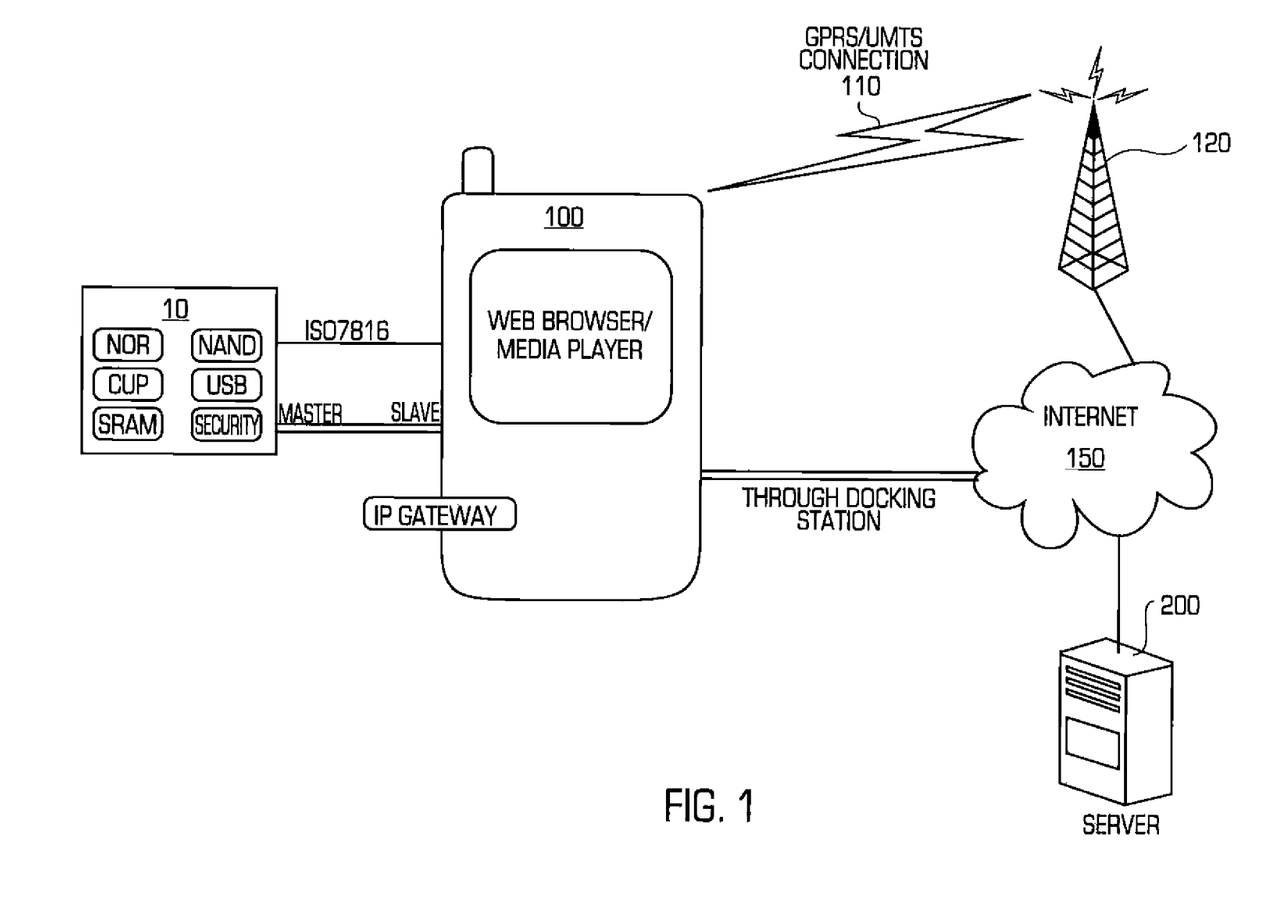
FIG. 1 is a diagram of the removable card of the present invention connected to a mobile wireless communication device of the present invention for connection to a mobile network, as well as to the Internet.

Referring to FIG. 1 there is a shown a graphic illustration of a mobile wireless communication device 100, e.g. a cell phone 100 for use in a publicly accessible (common carrier) wireless communication network, such as a cellular network 110, which includes cellular access towers 120. The cellular network 110, through access servers (not shown) located on or near the cell phone towers 120 can connect to a network of interconnected computer networks 150, also known as the Internet 150. Thus, the cell phone 100 can communicate wirelessly with other cell phones 100 on the cell phone network 110. In addition, the cell phone 100 can communicate wirelessly with the Internet 150 through the cell phone network 110 which has the access servers connected to the Internet 150. Further, as will be shown hereinbelow, the removable card 10 portion of the cell phone 100 can also be connected directly to the Internet 150 through a network portal device, such as docking station 160, which is connected to a personal computer, which connects to the Internet 150.

The cell phone 100 of the present invention has a removable card 10, much like the removable SIM card of the prior art. However, as will be seen, the features of the removable card 10 of the present invention are vastly different and improved over the removable SIM card of the prior art.

Figures 2, 3:
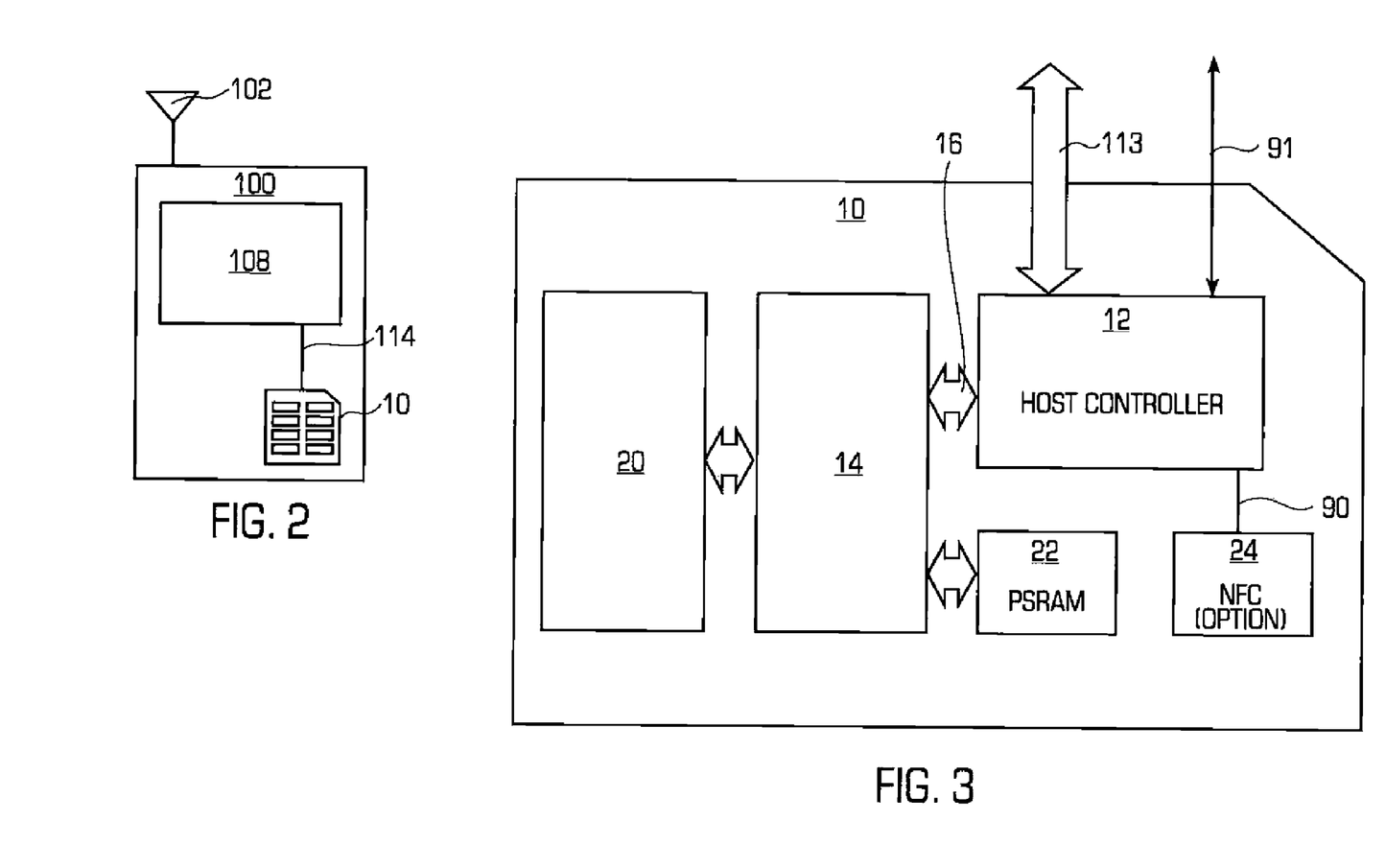
FIG. 2 is a schematic diagram of the removable card of the present invention connected to the mobile wireless communication device of the present invention.
FIG. 3 is a block level diagram circuit diagram of the removable card of the present invention.

Referring to FIG. 2, there is shown a schematic diagram of the removable card 10 of the present invention connected to the mobile wireless communication device 100 of the present invention. Because the device 100 is designed to operate wirelessly across the cellular network 110, the device 100 comprises an antenna 102. A transceiver 104 is connected to the antenna 102. The transceiver 104 transmits and receives modulated signals to and from the cellular network 110. Such components are well known in the art. The received signals may be demodulated and then converted into digital signals and provided to a gateway 106. The gateway 106 may also have an NAT (Network Address Translation) circuit. An NAT circuit 106 translates or maps a private IP address to one or more ports of a public IP address. As will be discussed hereinafter, the device 100 (through the removable card 10), may be assigned a public address (through the well known DHCP protocol) when the device is connected to the Internet 150, and may have a private address when operating as a local server such that the device 100 is not connected to the Internet 150. Digital signals to be transmitted are modulated and converted by the transceiver 104 into appropriate electromagnetic frequency signals for transmission by the antenna 102. Because the device 100 can access the Internet 150, a browser and media player 112 is also provided. The browser and media player 112 interfaces in the well known TCP/IP protocol as well as the HTTP protocol with the gateway 106 to provide and to receive digital signals received by the device 100 from the Internet 150, which may be displayed on a display 108. Associated with the browser and media player 112 is a processor (not shown) which also controls the transceiver 104 and other well known hardware circuits of the device 100 to communicate with the network 110.

The removable card 10 of the present invention is connected to the device 100 through a well known USB interface 114 through the docking station 160. The USB interface 114 connects to the Gateway 106. Thus, digital signals from the removable card 10 are provided to and from the device 100 through the docking station 160, through the USB interface 114, through the gateway 106 and through the transceiver 104 to the antenna 102.

The removable card 10 of the present invention is shown in greater detail in FIG. 3. in particular, the card 10 comprises a host controller 12 which interfaces with the USB interface 114 through a USB bus 113. In addition, the host controller 12 is connected to a memory controller 14, through a bus 16. The memory controller 14 controls a NAND memory 20 and a PSRAM 22. The operation of the memory controller 14 in controlling the NAND memory 20 and the PSRAM 22 is fully described in U.S. patent application Ser. No. 11/637,420, published on Jun. 28, 2007 under publication 2007-0147115, and assigned to the present assignee, which disclosure is incorporated by reference herein in its entirety. The host controller 12 may also be optionally connected to a Near Field Communicator (NFC) 24. An NFC 24 is a close range RF circuit that permits wireless communication in close proximity. Thus, the device 100 with the NFC 24 may act as an "electronic wallet" for financial transactions or for identification purpose, or as another access to the Internet 150. Of course, the device 100 can also be connected wirelessly with the Internet 150 via other forms of wireless networks, such as a Wi-Fi network.

Figure 4:
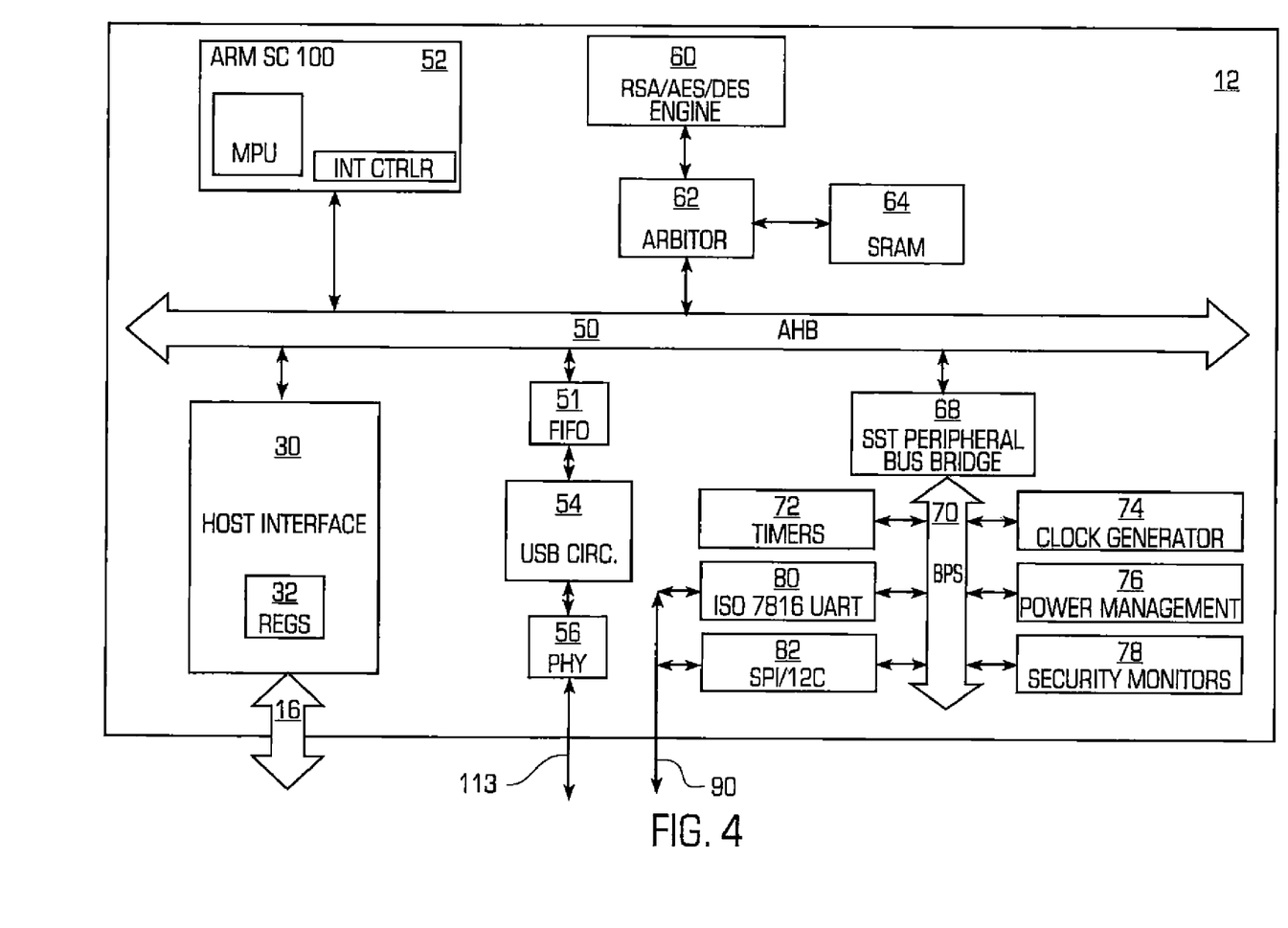
FIG. 4 is a detailed circuit diagram of the processor portion of the removable card of the present invention.

Referring to FIG. 4, there is shown a detailed schematic block diagram of the host controller 12. The host controller 12 comprises a high speed bus 50, to which a host interface 30, for connecting to the memory controller 14 is attached. The host interface 30 also comprises registers 32 for temporarily holding data that is supplied to and from the memory controller 14. The host controller 12 also comprises a FIFO (First-In First Out) circuit 51 which is connected to the high speed bus 50. The FIFO 51 is also connected to a USB controller circuit 54, which is connected to a PHY circuit 56 (which is the standard physical layer interface for a USB port. The circuit 56 includes pads, voltage level shifters and clock recovery circuits.) for connection to the USB bus 113. A secure processor, such as an ARM SC-100 processor 52 is also connected to the high speed bus 50.

The host controller 12 also comprises a RSA/AES/DES engine 60, which is a secure co-processor to the ARM SC-100 processor 52. The engine 60 is connected to the high speed bus 50 through an arbitration circuit 62. Since both the engine 60 and the processor 52 can request memory or other resources of the high speed bus 50 at the same time, the arbitration circuit 62 arbitrates simultaneous requests for access to the bus 50. The engine 60 also has access to a dedicated high speed cache RAM, such as an SRAM 64. Finally, a bridge circuit 68 is also connected to the high speed bus 50. The bridge circuit 68 is also connected to a slower bus 70, to which a timer 72 is connected, a clock generator 74 is connected, a power management circuit 76 is connected, a security monitoring circuit 78 is connected, a UART 80 is connected, and a SPI circuit 82 (Serial Peripheral Interface—a well known bus) is connected. The UART 80 and the SPI 82 are also connected to a bus 90, which is connected to the NFC 24. The controller 12 is also connected to a bus 91 which is a ISO7816 serial interface bus. It is a byte oriented Universal Asynchronous Receiver/Transmitter (UART) interface commonly found in prior art cell phones between the phone and the SIM card. This type of interface (using UART) is being replaced by the USB interface. Thus, the presence of the bus 91 is for backward compatibility only.

Operation of the Mobile Wireless Communication Device

There are many modes of operation of the mobile wireless communication device 100 of the present invention. Initially, it should be noted that the mobile network operator (MNO), the operator of the cellular network 110, distributes each of the removable cards 10, and also has a server 200 connected to the Internet 150. Each of the removable cards 10 of the present invention distributed by the MNO is assigned a unique public IP address by the MNO which is stored in the non-volatile memory portion of the removable card 10. The unique public IP address directs the device 100 to the MNO server 200. As disclosed in U.S. patent application Ser. No. 11/637,420, published on Jun. 28, 2007 under publication 2007-0147115, non-volatile memory is present in the NAND memory 20 as well as NOR memory being embedded in the controller 14. In either event, the MNO assigns and pre-stores a unique public IP address in the non-volatile memory portion of the removable card 10. The non-volatile memory may be divided into two portions, with the partition between the first portion 220a and the second portion 220b being alterable.

The partitioning of the first portion/second portion can be done by the MNO provider of the removable card 10. The first portion 220a can be accessed by the processor which controls the transceiver 104 and browser and media player 112, and the other hardware circuits that control the communication of the device 100. The second portion 220b can be accessed by the processor 52, in the removable card 10, which is accessible by the user. In addition, the processor 52 controls the degree of access (which includes the type of information) that a user may have to the first portion 220a. In any event, for reasons to be discussed, the unique public IP address assigned by the MNO is stored in the first portion 220a, and the processor 52 prohibits access thereto. However, other types of information, such as sensitive user information, such as user name, credit card, etc. may also be stored in the first portion 220a and the processor 52 may grant the user limited access to those type of information.

After the removable card 10 of the present invention is distributed to users, and the user has inserted the card 10 into the device 100 of the present invention, the user can then use the device 100 to operate on the cellular network 110, as it was done in the prior art. Similar to the prior art, the card 10 may also have information related to the usage of the device 100, such as telephone number, access code, number of minutes, calling plan etc on the cellular network 110 stored in the first portion 220a (user restricted) of the memory portion of the card 10. Clearly the storage of this type of information in the user restricted is appropriate, so that the user cannot have unlimited access. In this manner, the removable card 10 functions no differently than the SIM card of the prior art when used with the cellular network 110.

The inventive features of the present invention can be seen when the user attempts to use the device 100 to access the Internet 150. There are at least two possible modes (first mode or second mode) to access the Internet 150. The programming code stored in the non-volatile memory 14 can cause the processor 52 to access the Internet 150 in either the first mode or the second mode of operation.

In the first mode, the Internet 150 can be accessed by the removable card 10 through the device 100 through the cellular network 110. In that event the device 100 is connected to the Internet 150 through the access servers connected to the cellular network 110, near the tower 120. When initiated, the access servers (similar to an Internet Service Provider (ISP)) may assign a dynamic public IP address to the device 100 during the session connecting the device 100 to the Internet 150. Such dynamic assignment of public IP addresses when the device 100 is connected to the Internet 150 is well known in the art and is in accordance with the DHCP protocol. Alternatively, as discussed previously, the public IP address may be pre-assigned and stored in the removable card 10. The browser and media player 112 of the device 100 is then used to browse or surf the Internet 150. Contents from the Internet 150 can then be downloaded and saved in the removable card 10, in either the user restricted memory portion or the user accessible portion of the card 10.

For secure communication with the Internet, the user restricted portion of the memory portion of the card 10 may store a secret key. The RSA/AES/DES engine 60 of the host controller 12 can use that secret key to encrypt and/or decrypt communication to and from the Internet 150. The secret key can be provided by the MNO when it initially distributes the removable card 10 or it can be downloaded from the MNO server 200 which is connected to the Internet 150, when the device is connected to the Internet 150.

The information retrieved from the Internet 150, via the wireless network 110, may be saved in the user restricted portion of the removable card 10 which is associated with an assigned private IP address. The private IP address can be first assigned by the MNO and stored in the removable card 10 before distribution. Alternatively, the private address may be assigned by the access server connected to the cellular network 120. Finally, the private address may simply be the public IP address dynamically assigned by the access severs and then translated by the NAT circuit 106 into a private IP address. After the information from the Internet 150 is stored in the removable card 10, it can be retrieved by the browser and media player 112, and displayed on the display 108 of the device 100, using the private IP address. This is similar to the operation of an intranet. Thus, the removable card 10 serves to function as a local (private) server in providing the data stored in its memory to the browser and media player 112.

The use of a "private" IP address when the browser 112 is accessing in a local mode is advantageous because it is more economical than having two public IP address assigned to the device 100: one IP address for the phone portion of the device 100 when surfing or browsing the Internet 150 and another public IP address for the removable card 10, when viewing the contents thereof. Since the content stored in the removable card 10 is for the user using the device 100, there is no need for the removable card 10 to have a public IP address. Furthermore, the time when the user is viewing the contents stored in the removable card 10, the device 100 may not be connected to the Internet 150.

Figure 5:
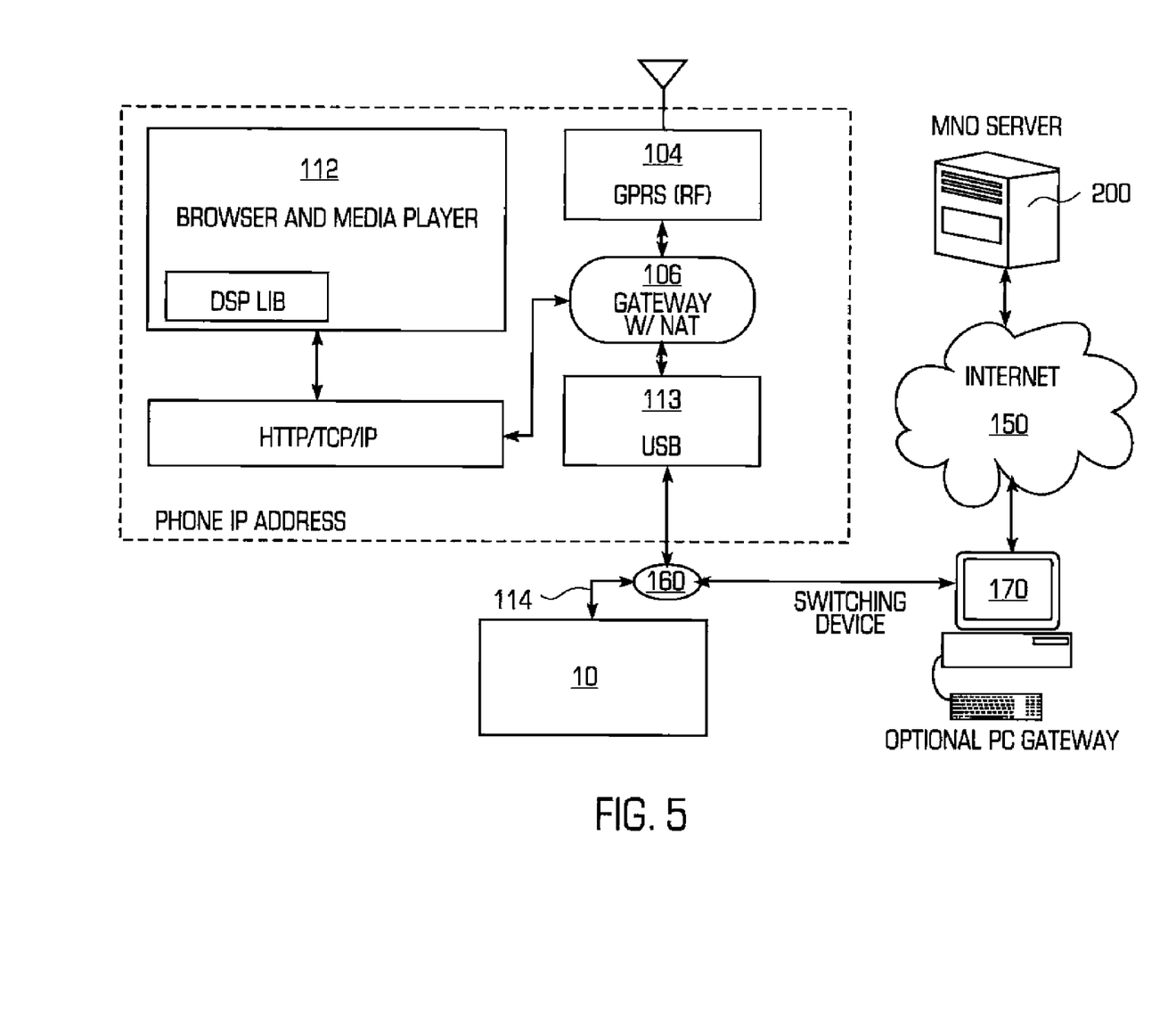
FIG. 5 is a diagram of the two modes of communication of the mobile wireless communication device with the removable card of the present invention with the Internet, wherein in the first mode, the removable card communicates through the wireless communication device wirelessly with the mobile network for access to the Internet, and wherein in a second mode the removable card is connected to a network portal device for connection to the Internet.

In a second mode, the device 100 can access the Internet 150 other than through the cellular network 110. One way is through a network portal device 170 such as a terminal connected to a PC (for example through a USB port). Another way is through a wireless link, such as Wi-Fi which connects wirelessly to a receiving device (not shown) that is connected to the Internet 150. In either way, the device 100 has a docking switch 160. Referring to FIG. 5, there is shown schematically a diagram of this mode of communication (along with the first mode) Normally, in the first mode, the removable card 10 is connected to the USB interface 114 through the docking switch 160. However, when the device 100 is connected to the PC 170 or through the NFC 24, the docking switch 160 is changed causing the removable card 10 to disconnect from the USB interface 114. Thus, for example, when a USB cable is connected to the docking switch 160, the removable card 10 disconnects from the USB interface 114 and connects directly to the PC 170 along its USB port. The docking switch 160 then breaks the connection between the removable card 10 and the rest of the device 100 including the transceiver 104. Because the removable card 10 contains the cellular network 110 access information, if the device 100 was accessing the Internet wirelessly through the cellular network 110, then the device 100 would cease to transmit/receive wirelessly to/from the cellular network 110. Similar to the first mode of operation, when the device 100 is connected to the Internet 150 through the docking switch 160, to the PC gateway 170, it is initially assigned a public IP address, by the Internet Service Provider (ISP) for connection to the Internet 150. Again, this is a dynamically assigned public IP address for use during the session that the device 100 is connected to the Internet 150.

Finally, because the removable card 10 stores a public IP address assigned by the MNO, in the user restricted portion of the memory, that public IP address directs the device 100 to the MNO server 200. During the time period when the device 100 is connected to the Internet 150 through the PC portal 170, and when the user is not browsing or surfing the Internet 150, (as in e.g. when the device 100 is in the docking station connected to the docking switch 160 for charging the battery for the device 100) the device 100 can go the MNO server 200 using the public IP address stored in the removable card 10. The MNO server 200 can then cause content, such as movies, or programming code (updates for the device 100) to be downloaded and stored in the user restricted portion of the removable card 10 of the device 100. The benefit of this mode is that a large amount of content can be downloaded when the device 100 is not connected to the cellular network 110, and when the user is not actively surfing or browsing the Internet 150. The downloaded movies or other material can be subsequently activated by an authorization code and/or payment code. Since the movies or other content were downloaded from the MNO server 200, the user can be sure of the trustworthiness of the content (i.e. free from virus etc.). In addition, since the owner of the content knows that the content is downloaded in a secure manner and stored in a user restricted portion, they can be assured that illicit copies will not be made. In this manner, this becomes a trustworthy procedure for all parties. Finally, by also permitting programming code to be distributed in this manner, an efficient and convenient mode is provided to assure the update of the devices 100.

Furthermore, each removable card 10 may also be assigned a unique IP address by the MNO operator. This offers another unique feature of the present invention. When the device 100 with the removable card 10 connected thereto is connected to the Internet 150, and with the removable card 10 having a unique IP address, the MNO server 200 which is also connected to the Internet 150 can download information for all removable cards 10 or just certain removable cards 10 or even only a specific removable card 10. The information downloaded to one or more removable cards 10 may be stored in the user restricted memory portion of the card 10. Examples of information that can be stored in the user restricted portion may include: administrative information such as change in calling plan, increase in minutes etc. Further, the "information" may be data or it may be programming code (including Java applets) for execution by the host controller 12. Thus, for example, the "information" downloaded from the MNO server 200 may be a program causing the host controller 12 to execute the code causing the device 100 to access the cellular network 110 to access the Internet 150 periodically or to access specified location on the Internet 150 (such as the IP address of the MNO server 200) or in some specified manner to retrieve updates, downloads, etc.

Figure 6:
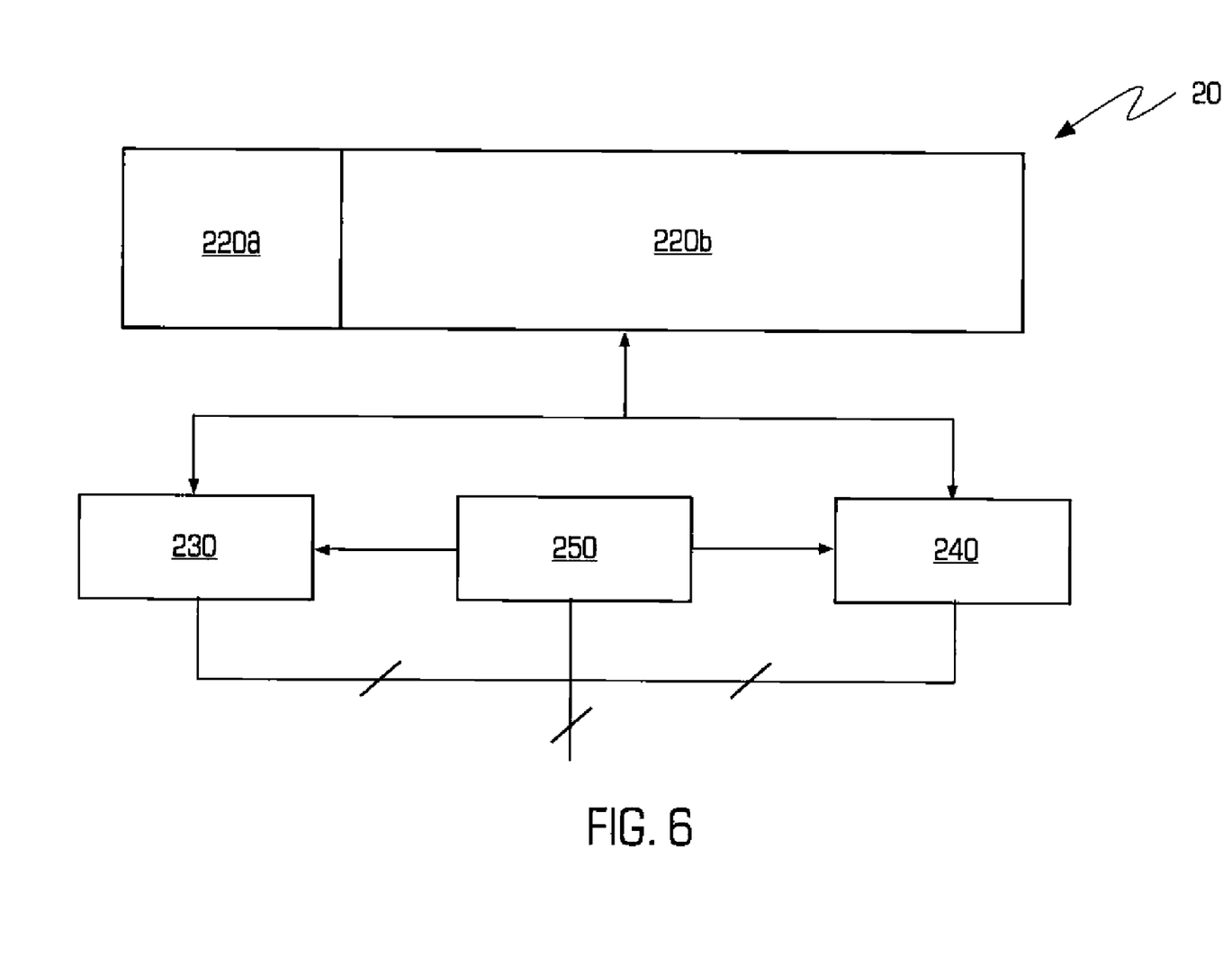
FIG. 6 is a block level diagram of the removable card of the present invention with its security feature.

Because the device 100 can connect to the Internet through the common carrier network, the user may store user data in the second portion 220b of the memory 20. However, since the memory 20 is accessible by the MNO, the MNO may provide services to the user such as back up for the user data stored in the second portion 220b of the memory 20. However, since the user data stored in the second portion 220b may be personal or confidential information of the user, the user will want the user data to be secure even from the MNO, and also in the event the device 100 is lost or stolen. Referring to FIG. 6 there is shown a block level diagram of a portion of the secure removable card 10 of the present invention. The card 10 has a non-volatile memory 20 with its first portion 220a which has restricted access by the user, and a second portion 220b to which the user can store user data. The MNO can access both the first portion 220a and the second portion 220b of the memory 20. The card 10 also has a volatile memory 250, for storing a user supplied password. The volatile memory retains the password only when power is supplied to the card 10 or the device 100. When the power is removed, the same password needs to be re-inputted by the user. The card 10 also comprises an encryption circuit 230, which receives inputted user data, as well as the output of the volatile memory 250. The encryption circuit encrypts the user data with the password and then the encrypted data is supplied to the second portion 220b of the memory 20 for storage. When it is desired to read the data from the second portion 220b of the memory 20, the encrypted data is read from the second portion 220b and is supplied to a decryption circuit 240. The decryption circuit uses the password from the volatile memory to decrypt the encrypted data and supplies the decrypted user data back to the user.

As can be seen from the foregoing the card 10 of the present invention is extremely secure. What is stored in the a second portion 220b is always encrypted data. Thus, even if the device 100 is lost or stolen and a would be hacker attempts to read the data from the second portion 220b, the hacker would find only encrypted data. The degree of security is limited only by the sophistication of the encryption circuit 130 and the number of bits of the password to encrypt the user data. Further, the encryption is active only while power is supplied. In the event the device 100 is turned off, and back on, a new session commences and the user will need to re-input the password.

Finally, in the event the user forgets the password, it should be noted that the password is not stored in any portion of the memory 20. Thus, if the password is forgotten, the penalty is quite severe. One way to mitigate this harsh result may be to store a "hint" question or phrase (such as what's the name of your favorite pet) in the second memory 220b, so that the user may be prompted to recall the forgotten password. However, such "hint" may also compromise the security of the card 10. Nevertheless, the password itself is never stored in the memory 20.

What is claimed is:

1. A removable card having electrical connections for connecting to a mobile wireless communicating device for use by a user to access a common carrier network to access a network of interconnected computer networks ("Internet"), comprising:
   a processor;
   a non-volatile memory connected to the processor, having two portions: a first portion and a second portion wherein said first portion is accessible by the provider of the common carrier network with said processor restricting access thereto by the user, and wherein said second portion is accessible by the provider of the common carrier network and with said processor granting access thereto to the user for storing user data therein; and
   logic circuit for encoding the user data to produce encrypted user data, wherein said encrypted data is stored in said second portion; wherein said logic circuit comprising a volatile memory for storing a user supplied password, wherein said password is stored in said volatile memory only when power is supplied to said memory;
   an encryption circuit for receiving the user supplied user data and the output of the volatile memory and for encrypting said user data with said password from said volatile memory to produce encrypted user data, and for storing said encrypted user data in said second portion; and
   a decryption circuit for receiving encrypted user data stored in the second portion and the output of the volatile memory and for decrypting said encrypted user data with said password from said volatile memory to produce user data.

2. The removable card of claim 1 wherein the partitioning of said first portion and said second portion is alterable.

3. The removable card of claim 1 wherein the non-volatile memory has programming code stored therein configured to be processed by the processor and operable in one of two modes: a first mode in which said card is connected to the device with the card storing information received wirelessly by the device from the Internet; and a second mode in which said card is connected to a network portal device, which is connected to the Internet, with the card storing information received through the network portal device from the Internet.

4. The removable card of claim 3 wherein in said first mode said card storing information received wirelessly by the device through a wireless network having a wireless access device connected to the Internet, and wherein in said second mode said card is connected directly to the Internet through the network portal device.

5. A mobile wireless communication device for use by a user to access a common carrier network to access a network of interconnected computer networks ("Internet") comprising:
- a transceiver for communicating wirelessly via a wireless common carrier network;
- a first processor for controlling communication of the device to connect to the common carrier network;
- a second processor;
- a non-volatile memory connected to the second processor, having two portions: a first portion and a second portion wherein said first portion is accessible by the provider of the common carrier network with said second processor restricting access thereto by the user, and wherein said second portion is accessible by the provider of the common carrier network and with said second processor granting access thereto to the user for storing user data therein; and
- logic circuit for encoding the user data to produce encrypted user data for storing in said second portion; wherein said logic circuit comprising a volatile memory for storing a user supplied password, wherein said password is stored in said volatile memory only when power is supplied to said memory;
- an encryption circuit for receiving the user supplied user data and the output of the volatile memory and for encrypting said user data with said password from said volatile memory to produce encrypted user data, and for storing said encrypted user data in said second portion; and
- a decryption circuit for receiving encrypted user data stored in the second portion and the output of the volatile memory and for decrypting said encrypted user data with said password from said volatile memory to produce user data.

6. The device of claim 5 wherein said second processor, non-volatile memory, and logic circuit are contained in a removable card.

7. The device of claim 6 wherein the partitioning of said first portion and said second portion is alterable.

8. The device of claim 7 wherein the non-volatile memory has programming code stored therein configured to be processed by the second processor and operable in one of two modes: a first mode in which said card is connected to the transceiver with the card storing information received wirelessly by the device from the Internet; and a second mode in which said card is connected to a network portal device, which is connected to the Internet, with the card storing information received through the network portal device from the Internet.

9. The device of claim 8 wherein in said first mode said card storing information received wirelessly by the device through a wireless network having a wireless access device connected to the Internet, and wherein in said second mode said device is connected directly to the Internet through the network portal device.

* * * * *